Sept. 1, 1953  I. N. GROTHE ET AL  2,650,361
HAND COVERING FOR USE IN ASSOCIATION WITH HANDLEBARS
Filed May 1, 1951  2 Sheets-Sheet 1

INVENTORS
Isabel N. Grothe
Elizabeth J. Smith
BY
Arthur Middleton
ATTORNEY

Sept. 1, 1953     I. N. GROTHE ET AL     2,650,361
HAND COVERING FOR USE IN ASSOCIATION WITH HANDLEBARS
Filed May 1, 1951     2 Sheets-Sheet 2
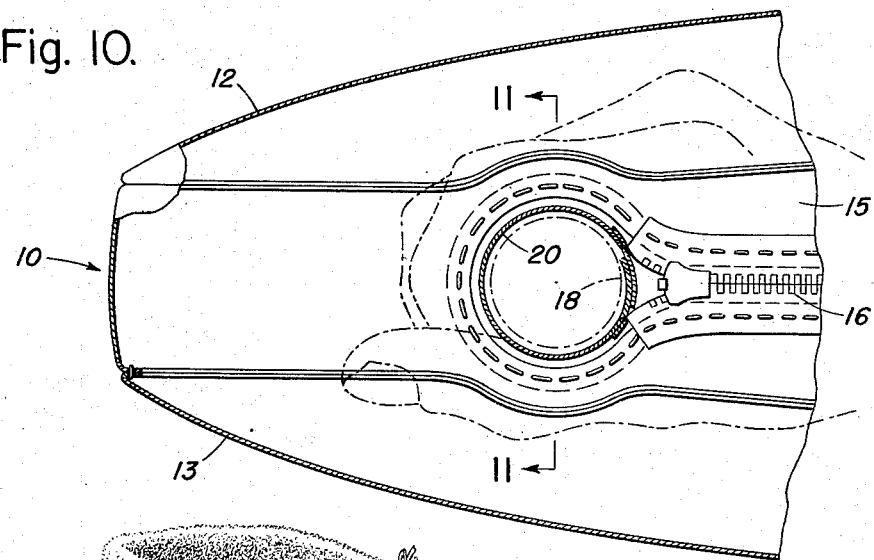
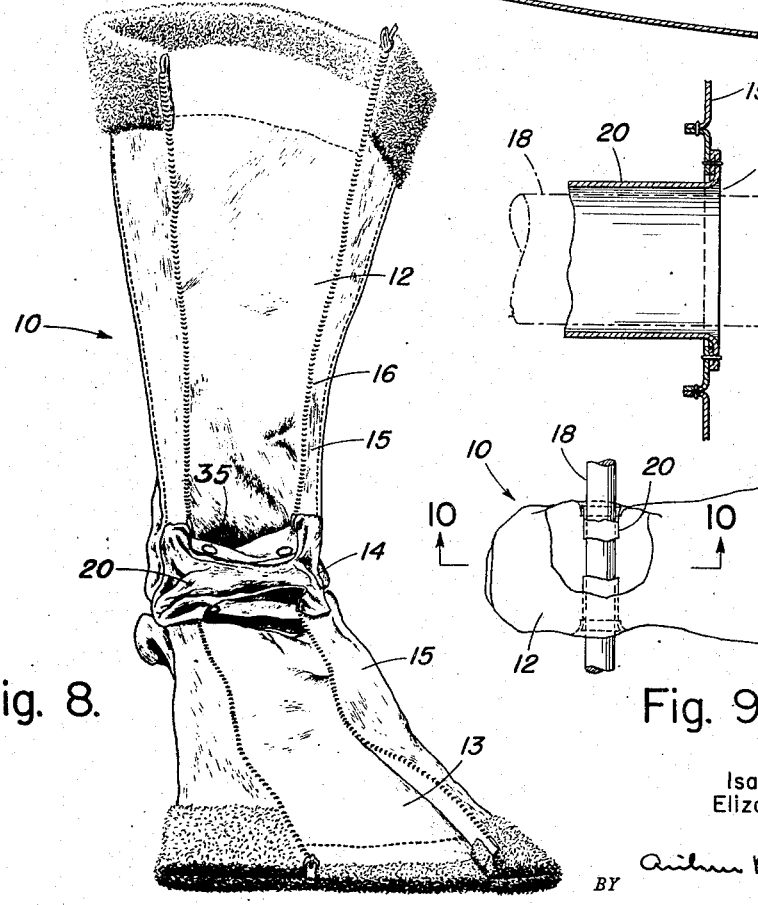
INVENTORS
Isabel N. Grothe
Elizabeth J. Smith
BY Arthur Middleton
ATTORNEY Patented Sept. 1, 1953

2,650,361

UNITED STATES PATENT OFFICE 2,650,361

HAND COVERING FOR USE IN ASSOCIATION WITH HANDLEBARS

Isabel N. Grothe and Elizabeth J. Smith, Westport, Conn.

Application May 1, 1951, Serial No. 224,046

1 Claim. (Cl. 2—17)

This invention relates to hand coverings or mitts usable in association with the handle or handlebar of hand-propelled vehicles such as perambulators, baby carriages, strollers and the like.

When pushing such a vehicle in cold weather one's hands get cold especially if the hands are left uncovered or snug-fitting gloves are being worn, and in order to insure warmth of the hands it is necessary to wear cumbersome outer hand coverings. However, it frequently occurs that such outer coverings must be removed in order to free the hands for other uses. When this happens there are two separate steps involved; removal of the outer coverings from the hands, and the laying aside or storage of the removed coverings in order to leave the hands unencumbered.

So it is one object of this invention to devise a type of warmth-insuring hand covering that is mitt-like in formation and which can be removably secured to the handlebar of the vehicle in such a manner that the hands are readily insertable or removable from the mitts while still leaving the mitts secured to the handlebar, thus eliminating the necessity of either searching for or separately laying aside the mitts when it is desired to don or doff them. It is another object of this invention to provide such a hand covering that is suitable for use in association with ordinary gloves or with bare hands. That is to say, the user of such hand coverings may if desired wear a lighter glove underneath such hand covering.

It is still another object of this invention to devise an acceptable fastening arrangement for such mitts whereby they can be readily secured to or removed from the handlebar of such a vehicle even though such handlebar is of the type that is closed at both ends so that objects must be secured around it rather than slipped over its end. Still another object is to devise such mitts that can be displaced with respect to each other while in place on the handlebar.

These and possibly other objects are attained by a mitt having a closed end as well as an open end and a top and bottom portion with a side portion joining the top and bottom portions, wherein in the side portion are two aligned apertures adapted to encircle the handlebar of the baby carriage, and separable fastening means for opening and closing access to the apertures of the handlebar. That is to say, the fastening means are operable to permit parts of the mitts to open for allowing the aperture to be threaded around and onto the handlebar, whereupon they are closed to retain the mitts in such threaded position on the bar, meanwhile the mitts remain open at their free end to permit free and rapid ingress and egress of the hands with respect to the mitts.

The mitt is preferably equipped with a smaller inner lining having its ends attached to the peripheries of the aligned apertures and connecting the apertures one with the other. This lining is adapted to snugly encircle the handlebar and provide an insulation between the wearer's hand and the cold handlebar. In this arrangement it will be preferable to provide the inner lining with its own separable fastening means to secure it in place on the handlebar independently of the fastening means used to secure the mitt proper to the handlebar.

Fastening means employed in this invention may be of any conventional type such as slide fasteners, snaps and the like. Similarly, the location of the fastening means for securing the mitt itself to the handlebar may take several forms. That is to say, the fasteners may run from the apertures along the sides of the mitt to the open end, or directly from one aperture across the top or bottom of the mitt to the other aperture or even around the closed end of the mitt. The important point being that the fastening means operate to open and close access to the apertures and inner lining by the handlebar.

As this invention may be embodied in several forms without departing from the spirit or essential characteristics thereof, the present embodiment is therefore illustrative and not restrictive, since the scope of the invention is defined by the appended claim rather than by the description preceding it, and all changes that fall within the metes and bounds of the claim, or equivalents of such metes and bounds, are therefore intended to be embraced by the claim.

Figure 8 shows a mitt at the open position said mitt being provided with an inner lining for encircling the handlebar.

Figure 9 shows the mitt of Figure 8 in position on the handlebar.

Figure 10 shows the mitt of Figure 8 in place on the handlebar with the hand encircling it.

Figure 11 shows details of the construction of the inner lining of mitts similar to those shown in Figures 5 and 8 through 10.

Figure 1:
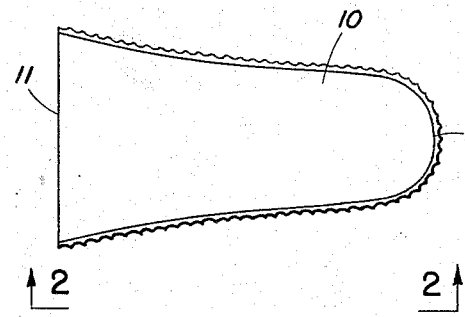
Figure 1 is a plan view of the mitt of this invention.
Figure 2:
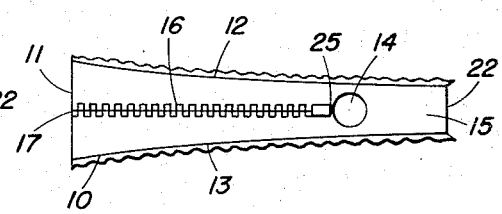
Figure 2 is a side elevation of the mitt shown in Figure 1 taken along lines 2—2 of Figure 1.

Figure 1 shows a plan view of a mitt 10, which has an open end 11 for inserting hands as well as a closed end 22. The length along 2—2 of Figure 1 is such that when the hand is inserted into the mitt through open end 11 the mitt extends well up on the wrist of the wearer thus allowing the coat sleeves to be inserted into this end and preventing stray breezes from finding their way up the wearer's sleeve. Figure 2 is a side view of the mitt shown in Figure 1 taken along the line 2—2 of Figure 1 and showing only one side of the mitt, the side not shown in Figure 2 being identical to the side shown. The mitt can be made of any material suitable for insuring warmth or protection of the hands, such material may be conventional wool yarns or it may be fabric of another nature including plastic yarns and the like. The mitt 10 is made up of a top portion 12 and a bottom portion 13 which are secured together by side portion 15. Side portion 15 extends from the open end 11 around closed end 22 of the mitt returning to end 11 on the opposite side. End 11 is left open at all times to permit ingress and egress of the hands. Side portion 15 is provided with aligned apertures, such as the one shown at 14, of suitable size to permit threading such aperture around and onto a handlebar. Extending along side 15 from point 17 on end 11 to point 25 on the edge of aperture 14 is a slide fastener 16 for separating side 15 into two portions between points 17 and 25 so as to permit access to apertures 14. In Figure 2, the fastener 16 is in a closed position so that the side 15 is maintained as a single piece along its entire length except for the aperture 14.

Figure 3:
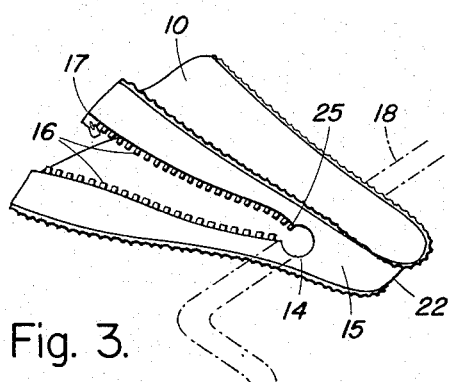
Figure 3 is an isometric view of the mitt in association with the carriage handlebar, the mitt being in the open position for removal from or application to the handlebar.
Figure 4:
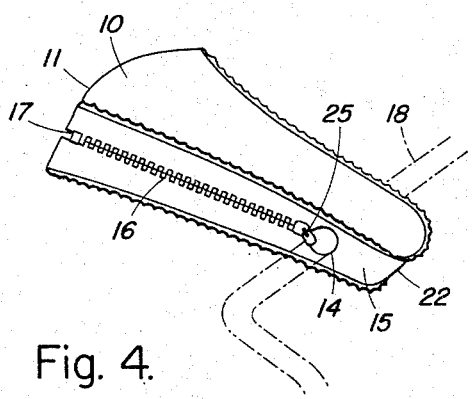
Figure 4 is a view similar to that of Figure 3 except that the mitt is closed upon the handlebar.

Figure 3 is an isometric view of a mitt 10 having an open end 11 and a closed end 22 similar to that shown in Figures 1 and 2 but in association with a baby carriage handlebar 18. Slide fastener 16 is opened along its entire length between points 17 and 25 so that side 15 is separated into two portions between points 17 and 25 in order to provide access to apertures 14 for threading the mitt around handlebar 18. The slide fastener 16 has its open end at point 17 to permit ease of securing together for fastening. Figure 4 shows the mitt 10 of Figure 3 in association with a handlebar 18 and is identical to Figure 3 except that the slide fastener 16 is closed along its entire length between points 17 and 25. Side 15 is now maintained as a continuous section except for aperture 14 which is encircled around handlebar 18 thus securing the mitt to the bar. When the mitt is thus secured it is ready for use. Hands can be readily inserted or removed from the mitt at its large open end 11. If desired the mitt can be moved along the bar 18 while it is in its secured position thus permitting movement of one mitt with respect to another mitt on the same handlebar even though both are secured thereto.

Figure 5:
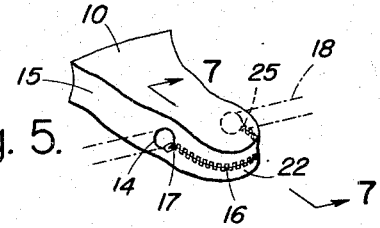
Figure 5 is similar to Figure 4 showing a modification of the location of the separable fastening means.

Figure 5 is an isometric view of a mitt 10 of the type embodied by this invention. It is similar to the view of Figure 4 except that the separable fastening means 16 extend around the closed end 22 of the mitt from point 17 on the periphery of aperture 14 to a similar point 25 on the aligned aperture opposite aperture 14. This location of fastening means has the advantage of requiring only a single slide fastener to separate side 15 and provide access to apertures 14 for threading them around handlebar 18.

Figure 6:
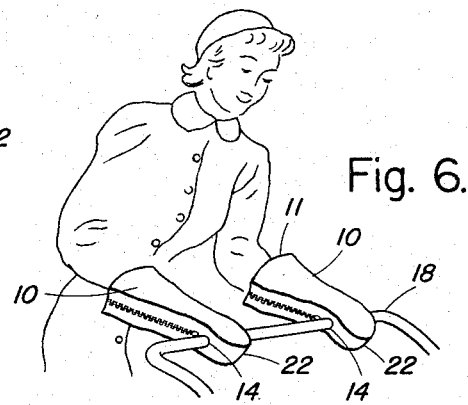
Figure 6 is a perspective view showing two mitts in association with the baby carriage handlebar and in use by a person pushing the carriage.

Figure 6 is a perspective view showing the mitts in use on the handlebars of the baby carriage with the hands in position inside the mitts so that open ends 11 are toward the wearer while closed ends 22 are away from the wearer. The mitts are of sufficient size so that they will extend upwardly over the wearer's wrists and cuffs thereby preventing the passage of chill breezes up the sleeves. The mitts 10 have their sides secured together and are in position on handlebar 18 with handlebar 18 extending through the mitts at apertures 14, thus the mitts shown in Figure 6 are similar to that one shown in Figure 4 except that in Figure 6 there are two mitts secured to the handlebar and the wearer's hands are inserted therein. In the event the wearer desires to remove her hands from the mitts she has only to withdraw them which may be freely done and leave the mitts secured to the handlebar where they will be available for future use. The hands are inserted and removed through open end 11 of the mitt. When in position such as shown in Figure 6 the mitts may be independently moved along handlebar 18 separately from each other even though both are secured to the handlebar. That is to say, even though the mitts are secured to the handlebar they may be readily moved along the axis of such handlebar thus allowing free removal of the hands as well as permitting the movement of the mitts to a more remote place on the handlebar when not in use.

Figure 7:
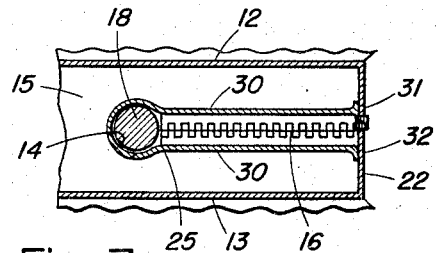
Figure 7 is a cross section view taken along lines 7—7 of Figure 5 showing a modification wherein a lining is provided between the wearer's hands and the handlebar.

Figure 7 is a partial cross-sectional view taken along the lines 7—7 of Figure 5 and shows a modification whereby a lining 30 extending around handlebar 18 for portecting the hands from the cold handlebar is provided. In Figure 7 is shown the upper portion 12 of the mitt, side portion 15, bottom portion 13, aperture 14, closed slide fastener 16, closed end 22, and end 25 of slide fastener 16. The lining 30 is secured to side portion 15 in such a manner that the lining is continuously fastened to the side portion 15 from point 31 on closed end 22 around aperture 14 thence to point 32 on closed end 22 so that when the handlebar 18 is in place in aperture 14 the lining 30 passes around handlebar 18 and aperture 14. If slide fastener 16 is opened so as to separate side portion 15 into two sections, then the lining 30 will also be opened so as to provide access to aperture 14. A similar lining provision may be made in the mitts shown in Figures 1 through 4.

A further modification of the construction of the mitt is to provide a lining adapted to encircle the handlebar and provide a layer of material around the handlebar and between the handlebar and the hands of the wearer. This lining may or may not have its own fastening means, however, in the ordinary case, the hands of the wearer will keep it in proper position. An embodiment of this particular feature is shown generally in Figure 7 and in detail in Figures 8 through 11.

In Figure 8, the mitt 10, shown in the open position, comprises top portion 12, bottom 13, and side members 15 provided with separable fasteners 16. Aligned apertures are provided at 14 to permit passage of a handlebar when the mitt is closed. A small inner lining 20 is provided and is secured to the periphery of apertures 14 so that when the mitt is closed a layer of material surrounds the cold handlebar. Separable fasteners 35 are provided to secure the inner lining around the handlebar.

Figure 9 shows the mitt 10 in position on a handlebar 18 and shows the relative position of handlebar 18 and lining 20.

Figure 10 is a view taken along lines 10—10 of Figure 9 and depicts the relative position of the hand with respect to lining 20 and handlebar 18. As shown in the drawings, the hand is entirely protected because the mitt itself protects from breezes and direct contact with outside air while lining 20 insulates the hand from the cold handlebar and thus prevents the loss of heat by conduction.

Figure 11 shows in greater detail the position of inner lining 20 with respect to handlebar 18, sides 15, and apertures 14. Lining 20 is equipped with its own separable fastening 35 to secure it snugly around handlebar 18.

According to this invention the size of the mitts will vary according to the material used, the size of the proposed wearer's hands and the size of the handlebar with which it is contemplated the mitts will be associated.

Whereas we have described the separable fastening means as being of the slide fastener type it is to be understood that any separable fastening means may be used without departing from the scope of this invention.

We claim:

For use on the handlebar of a hand-propelled vehicle such as a baby carriage, a pair of independently movable mitts wherein each mitt is provided with an open end as well as a closed end and has top and bottom portions secured together by side portions, two aligned apertures in the side portions adapted to encircle a handlebar, separable fastening means to open and close access to the apertures by the handlebar, an inner lining adapted to encircle the handlebar and having its ends secured to the peripheries of the apertures thus connecting the apertures one with the other, and separable fastening means along the connecting length of said lining to open and close access to the handlebar, whereby when the mitt is positioned on the handlebar there is provided a layer of material between one handlebar and the wearer's hand while the mitt itself surrounds the hand.

ISABEL N. GROTHE.
ELIZABETH J. SMITH.

References Cited in the file of this patent

UNITED STATES PATENTS

| Number | Name | Date |
| --- | --- | --- |
| 2,089,086 | Farkas | Aug. 3, 1937 |